United States Patent Office 3,681,041
Patented Aug. 1, 1972

---

3,681,041
IONICALLY MODIFIED GLASS BY ELECTRIC FIELD IMPACTION
Guy d'Huart, Versailles, France, assignor to Compagnie de Saint-Gobain, Neuilly-sur-Seine, France
Filed Mar. 3, 1969, Ser. No. 803,537
Claims priority, application France, Mar. 4, 1968, 142,178
Int. Cl. C03c 15/00, 21/00; B01d 59/40
U.S. Cl. 65—30
17 Claims

ABSTRACT OF THE DISCLOSURE

Glass is strengthened by the ionic interchange of a smaller for a larger ion at a temperature above the strain point and by hot contact. The smaller ion is then displaced by a larger ion, at a temperature below the strain point, by electromigration. New products having highly distinctive internal stress patterns are produced.

---

This invention relates to the alteration and improvement of the qualities of glass by ionic compaction, such qualities of the glass as its strength and fragmentation pattern being altered to advantage. As ordinary glass, called silica-soda-lime glass, is used in the largest quantities, and as great quantities of flat glass have that constitution the invention will be particularly described in its application thereto, but without limiting the generality of its application to other types, of which optical glass is an example.

It is known that the mechanical resistance of glass objects and particularly flat glass can be increased by introducing compression strains, either by rapid reduction from high temperature or by ionic substitution, especially in the latter case by replacing some of the alkali ions in the glass by others of larger diameter. It is to be understood that ionic diameter is present theory reasonably explaining fact but without limiting the invention should a more sophisticated theory be developed.

To introduce compression in an outer layer of the glass by the ionic substitution of a larger ion for a smaller, it has been necessary to operate by contact of the glass containing the ion to be replaced with a metal salt of the ion to be substituted at a temperature below the strain point of the glass, which for ordinary glass is at a viscosity of $10^{14.5}$ poises. However, to obtain ionic penetration and substitution, for instance of K for Na, to any considerable depth in the glass at such temperatures (300–450° C.) requires such extended treatment (e.g. 72 hours at 450° C. to penetrate 30 microns) that the cost is excessive and the result disproportionately small.

To speed up the substitution an electric field has been imposed on the system, the field passing through the glass, driving the replacement ions in and expelling the replaced ions. By that technique it has been necessary to reverse the polarity of the field after one face has been put under compression, if both faces of a glass object are to be put into a state of compression, a method having the three objections that during the impregnation, ion exchange, and compaction of the first face, especially in the case of thin glass sheets, undesirable deformation may occur, that the inversion of polarity may break the sheet especially during the first instants of the inversion, and that the energy yield is always inefficient because some of the electric energy used during the compaction of the second face is employed in ejecting a part of the ions which had been introduced electrically into the first face.

It is an object of this invention to make a new type, or new types, of glass the distinctive character of which is revealed by the internal strain patterns as revealed by polarized light and the apparatus called the Babinet compensator. As the use of the instrument is well known, it will not be described. Another object is to make ionically compacted glass more efficiently as to energy yield including all forms and especially consumption of current, depth of penetration, uniformity of penetration, speed of process, and industrial efficiency.

The objects of the invention are accomplished, generally speaking, by a glass object having at least one of its faces under compression by ionic compaction, the interior region contiguous thereto being under tension and by a method of strengthening glass by ion exchange which comprises replacing alkali metal ions in a part thereof with smaller alkali metal ions by hot contact ion exchange, and replacing the smaller alkali metal ions in said part with larger alkali metal ions by electromigration ion exchange.

In a first phase of the process of this invention, alkali ions smaller than the alkali ions in the glass itself are put into at least one face of the glass at a temperature above that at which strains are released in the glass, called the strain point, and in a second phase the temperature is lowered below the strain point and ions larger than those introduced during the first phase are driven by electromigration into one or the other of the faces of the glass.

Typical of the process is the treatment of a pane of silica-soda-lime glass, the invention including the first phase of putting at least one face of the glass into contact with a molten lithium salt at a temperature above about 500° C., which is above the strain point for such glass, maintaining the contact until there has been sufficient penetration and substitution of small (Li) for larger (Na) ions, for instance to a depth of 150 microns, which requires only 20 minutes at 580° C., and the second phase of introducing potassium ions by electromigration at a temperature below the strain point (e.g. 450° C.) through one of the faces of the glass, that face being made anodic by contact with a molten potassium salt and by passing a direct current from an anodic electrode in contact with that salt to another electrode in operative contact with the opposite face of the glass. The electromigration requires only from a few minutes to a few tenths of minutes.

The results of this novel treatment may vary widely, according to the operating conditions, but they have this in common that strains of compression appear in at least one of the faces of the sheet, and these strains may be very large and confer substantial mechanical resistance (strength).

One of the main advantages of the invention is that it requires only a short time because the mobility of the ions is increased by temperature in the first, hot contact phase by the relatively high temperature employed, close to the softening point of the glass, and by the electric field in the second phase. The process is advantageously endowed with great flexibility and accuracy of control because of the numerous factors that can be varied in each of its phases. In general, if one considers the choice of faces of the glass to be subjected to the introduction of ions from the outside, either in the first or second phases or steps, he perceives three overall possibilities:

(1) Replacement of alkali ions in both faces of the glass by smaller alkali ions, by hot contact, followed by the anodic electromigration of alkali ions larger than those introduced in the first phase into one of the faces of the glass;

(2) The smaller alkali metal ions are made to replace the larger alkali metal ions of the original glass in only one face of the glass, and the electromigration is conducted from the opposite face as anode, large ions being driven into and displacing original ions which flow through the glass toward those which had been introduced by hot contact;

(3) The first phase as in (2), the electromigration of larger ions is conducted by making the impregnated side anodic by contact with a source of larger alkali metal ions connected to a DC generator which establishes a field through the glass of which the part controlling the unimpregnated face of the sheet is cathodic.

In the case of variant (1) the first phase may be carried out by immersing the glass in a molten lithium salt at a temperature above the strain point, producing on both faces a surface layer rich is lithium ions by exchange of ions between the silica-soda-lime glass and the molten salt. In the second phase larger alkali ions (K or NA) are driven into one of these impregnated faces by electromigration at a temperature below the strain point, the anodic face of the sheet coming under increasing compression as the ionic impregnation progresses. The Li ions in that layer are driven deeper into the glass, producing a layer under tension. Furthermore, in the cathodic face of the sheet all or some of the Li ions are replaced by Na ions driven from the center of the sheet, putting that face also under compression but usually of a shape and magnitude different from that of the anodic face. There is thus produced a sheet having both faces under compression and with a layer under tension between the two and frequently concentrated contiguous to the anodic compression layer.

In the second variation, the first step or phase is carried out by floating the glass on a molten lithium salt above the strain point, providing a layer rich in lithium on one face of the glass. In the second phase, the electromigration is carried out from the opposite face as anode, for instance with K ions. The anode face is put in compression but the Li face is also compressed by the flow of Na from the central layers, which displace the Li ions.

If this step is carried out using Na ions instead of K ions, the same ions displaced by the Li ions in the first phase, no strain will be imposed on the anode layers but in the cathode face compression strains appear as the Li ions are progressively replaced by Na ions provided by the glass and participating in the electromigration. It is a curious fact that the chemical constitution of the sheet is the same as it was originally but the glass has been strengthened by the appearance of substantial compression and opposed tension strains in the outer layers on the cathode side. This is important because glasses containing K instead of Na are less resistant, so that this treatment allows improvement without reduction of resistance.

In the case of variant (3), the first step is the same as in the second variant but electromigration is carried out from the impregnated side as anode, using either Na ions or K ions. The replacement of the Li ions by either Na or K ions produces compressive surface layer stresses, the Li ions migrate inward, displacing Na ions which flow toward the cathode, and establishing a tensioned zone adjacent the layers of anodic impregnation.

In the following examples several variants of the invention are set forth,, presenting operative conditions, and the strain phenomena, both tension and compression, which they produce in the object treated.

In the drawings:

FIG. 1 is an elevational view of apparatus employed in the second phase of the invention;

FIGS. 2a, 2b, and 2c are Babinet compensator strain curves, greatly enlarged, showing the strains in the glasses of Examples 2a, 2b, and 2c. The width of the figures represents a cross section through a sheet of glass 2 mm. thick;

FIGS. 3a, 3b, and 3c are curves indicating the distribution of strains imposed in glass by the treatments of Examples 3a, 3b, and 3c, respectively;

In all curves the abscissae (horizontal) represent the thickness of the glass sheet and the shaded areas the strains, horizontal indicating the penetration of ionic compaction and vertical the intensity of the strains measured in bars or kg./cm.$^2$. The horizontal line in each figure is the line of null stress. Distance above that line is compression and distance below tension. Example 1 describes the apparatus and operative technique used in all examples, and all examples provide numerical data concerning the process and the result of it.

Example 1

The glass employed in all the examples was window glass of ordinary type 2 mm. thick having the chemical composition in weight percent:

| | |
|---|---|
| $SiO_2$ | 70.65 |
| $SO_3$ | 0.30 |
| $Fe_2O_3$ | 0.10 |
| $Al_2O_3$ | 1.10 |
| CaO | 10.9 |
| MgO | 3.02 |
| $Na_2O$ | 13.75 |
| $K_2O$ | 0.07 |

Disks 80 mm. in diameter were cut out of the glass for the tests.

The first step, ion exchange by hot contact, was effected by heating the glass to 560° C., which was above its strain point, and immersing it in a molten salt bath containing 66% anhydrous lithium sulfate and 34% anhydrous manganese sulfate at 600° C. When only one side of the disk was to be treated the disk was floated on the bath. The duration of contact is indicated in each example. The lithium ions diffused into the contiguous surface layer of the glass, exchanging places with sodium ions which passed into the salt bath. The salt bath was held by a borosilicate glass receptacle supported by a stainless steel coat kept in a furnace at 600° C.

The disk was put in the bath by laying it flat on a foraminous platinum support which descended vertically into the furnace through an appropriate opening after passing through a preheating zone in which it reached 560° C. in about 5 minutes. The disk was wholly immersed or floated according to the test. After contact with the bath for the time chosen the disk was lifted out of the furnace by its support, cooled, and washed with water.

Figure 1:
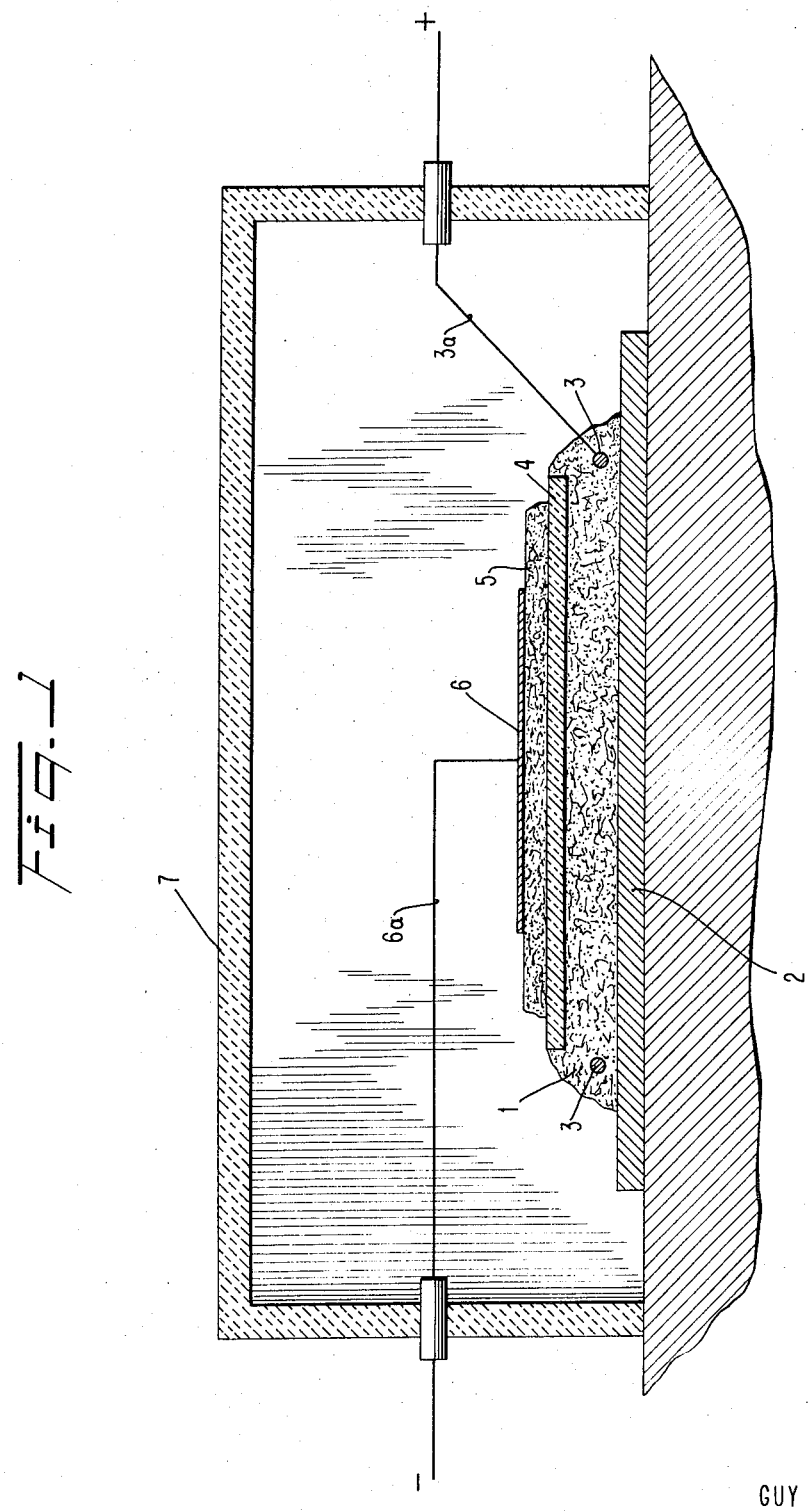

Any technique of electromigration can be employed but the tests of this series were carried out to avoid the use of tight joints at the rim, which are necessary with some techniques to isolate the anode from the cathode compartment. The technique employed is illustrated in FIG. 1, wherein each face of the disk is put into contact with an electrode layer composed of inert powder mixed with a salt containing the ions which are to be driven into the disk; the electrode layers are in contact, respectively, with the positive and negative poles of a source of direct current.

In each example the electrode layer was composed of 48% alumina of industrial fineness and 52% of potassium nitrate, by weight. This mixture was hot pressed in a mold to form a disk 1, 12 cm. in diameter, which was placed on an aluminum electrode 2, 25 cm. in diameter. A circular electrode 3, 10 cm. in diameter, of platinum wire 2 mm. thick was embedded in the electrode layer outside the circumference of the glass disk 4, which was sunk into the top of the electrode layer. On top of the disc was placed a second electrode layer 5, 7 cm. in diameter and 5 mm. thick. The constitution of the electrode layers can be represented by $KNO_3/Al_2O_3$ or $NaNO_3/Al_2O_3$. A platinum disk electrode 6, 6 cm. in diameter and .5 mm. thick completed the pile. Lines 3a and 6a connected the respective electrodes to opposite poles of a source of direct current, 3a being the anode in this case.

The pile was put into furnace 7 capable of being heated above 400° C. Thermal equilibrium was attained at 10 minutes, at which time the electrode layers became pasty while remaining coherent and became conductive as the alkali nitrate fused. An electric field was thus established between the electrode layers and migration of alkali ions from electrode layer 1 toward the cathode began.

The release of $NO_2$ took place only on the circular anode 3 which, being outside the anode layer, did not adversely affect the electrical contact of the electrode layer 1 with the glass disk. The quantity of electricity per area unit passing through the glass is computed readily from the current density and the duration of current flow; the ions move into the glass along a substantially plane front toward the cathode and the depth of penetration is calculated from these figures, revealing the depth to which the alkali ions of the glass have been replaced by the alkali ions from the anode layer.

In Examples 2a, 2b, 2c each disk of glass has undergone a first phase of hot contact ionization on both faces in a molten lithium salt by immersion in molten lithium sulfate and manganese sulfate at 600° C.

Example 2a

Figure 2A:
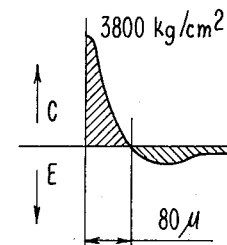
Figure 2A:
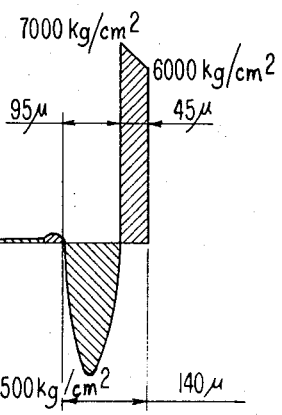

Immersion in the hot contact bath was for 10 minutes, producing the exchange of lithium for sodium on both faces of the disk of glass to a depth of 150 microns. The disk was then arranged as in FIG. 1, the electrode layers being of $KNO_3$. Current density was 4 ma./cm.$^2$, duration of current flow 22 minutes, passing 5 coulombs (c.) 1 cm.$^2$ through the glass and replacing the alkali ions of the anode face of the glass by K to a depth of 45 m$\mu$. This was measured by Babinet compensator, revealing the strain pattern of FIG. 2a. The outer layer to a depth of 45 m$\mu$ had acquired compression at the surface of 6000 kg./cm.$^2$ which increased to 7000 at 45 m$\mu$ depth. Penetration was uniform. Inside and contiguous thereto was a layer 95 m$\mu$ thick under tension which attained a maximum value of 4500 kg./cm.$^2$. In the outer of these layers the alkali ions (mainly Li) had been replaced by K and in the tension layer Li had displaced Na. The displaced Na ions migrated toward the cathode.

On the cathode face compression of 3800 kg./cm.$^2$ had been built up, dropping to 0 at a depth of 80 m$\mu$. The Na ions from the center of the piece, flowing with the current toward the cathode, displaced the smaller Li ions from this layer.

Between the layers of major strains there were layers of slight compression and tension, the former near the layer of major tension, the latter toward the cathode, which tended to produce a slight concavity on the anode side, but this could be eliminated by prolonging the electromigration as in Example 2b.

It will be observed that the disk of this example has one outer layer containing K, the other containing Na, and an inner layer containing Li adjacent the K layer.

Example 2b

Figure 2B:
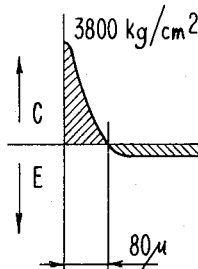
Figure 2B:
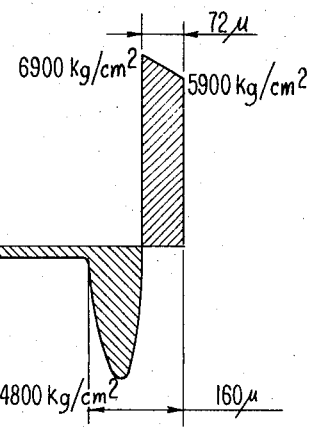

Operating exactly as in Example 2a except that the duration of electromigration was 34 minutes and the quantity of current 8 coulombs/cm.$^2$. This drove the K ions to a depth of 72 microns. FIG. 2b can be read as Example 2a was read, it being observed that the central layers are under small but uniform tension, eliminating curvature of the disk.

Example 2c

Figure 2C:
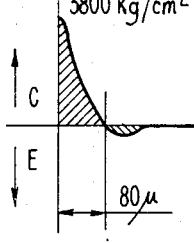
Figure 2C:
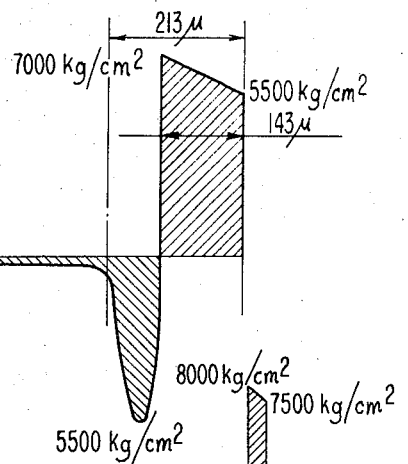

Operating exactly as in Example 2a except that the duration of electromigration was 68 minutes, the depth of penetration was 143 m$\mu$. FIG. 2c can be read as was Example 2a. There is a slight unbalance in the central layers which caused a trifling curvature of concavity toward the cathode side.

In the following examples the hot contact ionic transfer was applied to one side only of the glass disk, by floating the disk on the molten salt bath. The duration of contact affects the depth of penetration. After ending the treatment the disk was cooled, washed and subjected to electromigration as aforesaid. The face enriched with Li was made cathodic in the pile, the penetration of larger ions, K or Na, proceeding through the opposite face. For a duration of treatment in the first phase there is produced a corresponding depth of penetration by Li, and similar differences of result are produced by altering the duration of electromigration.

Example 3a

Figure 3A:
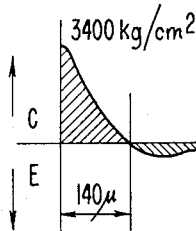

The glass disk floated at 600° C. on the lithium salt bath for 60 minutes. Penetration by ion exchange was to a depth of 350 microns, after which the disk was subjected to electromigration according to Examples 2a, 2b, 2c, the anode being the untreated face of the disk. The electromigration made at 400° C. was continued until the anode face had been penetrated by K to a depth of 30 m$\mu$ (15 minutes @ 4 ma./cm.$^2$). FIG. 3a reveals the strain pattern in the disk. The anode being at the right, there is compression to a depth of 30 m$\mu$ of 7500 to 8000 kg./cm.$^2$.

On the cathode face the lithium layer of 350 m$\mu$ was replaced by a layer of 140 m$\mu$ in which a compression gradient goes from 0 to 3400 kg./cm.$^2$ at the surface. The compression is due to the replacement of lithium by sodium ions derived from the inner layer of the glass. Between the outer layers is a zone of small tension (180 kg./cm.$^2$) which is evenly distributed, eliminating curvature.

Example 3b

Figure 3B:
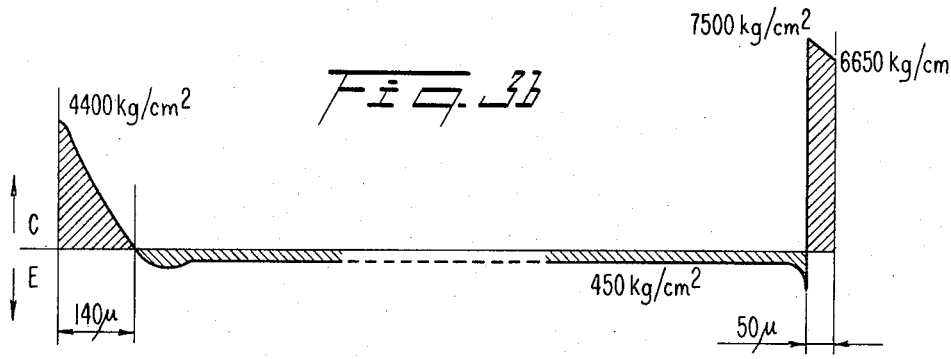
Figure 3C:
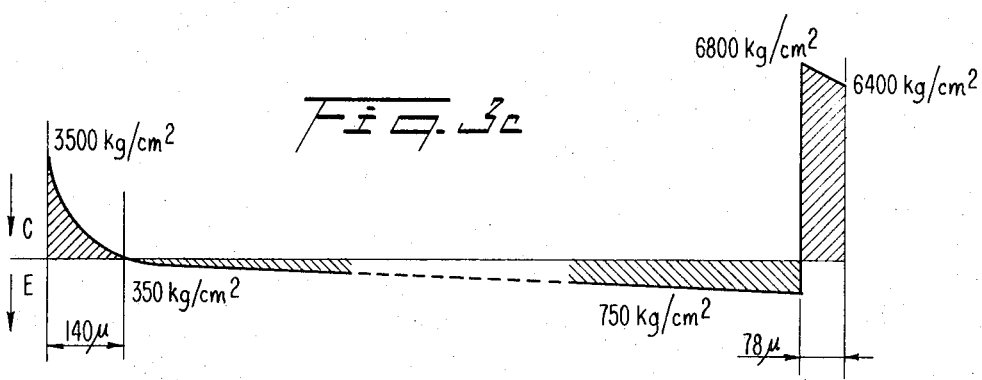

Operating as before but prolonging the electromigration for 24 minutes introduced the K ions to a depth of 50 m$\mu$. FIG. 3b can be read as the others were, exhibiting different values of compression and tension. The zone of tension between the outer compressed zones is regular and of about 450 kg./cm.$^2$. The glass disk was flat.

Example 3c

Operating as in Examples 3a and 3b but continuing the electromigration for 37 minutes produced ionic replacement by K for a depth of 78 m$\mu$. On the anode side a layer in compression 78 m$\mu$ deep had 6400 kg./cm.$^2$ on the surface and 6800 kg./cm.$^2$ at the 78 m$\mu$ depth. On the cathode face the zone of compression was 140 m$\mu$ deep and rose in a smooth curve from 0 at that depth to 3500 kg./cm.$^2$ at the surface. Between these surface layers was a central region under tension in which the tension increased regularly from 0 at 140 m$\mu$ on the cathode side to 750 kg./cm.$^2$ at 78 m$\mu$ on the anode side. There was concavity facing the cathode side.

Example 3b appears to represent the upper limit of thickness of the layer in which K has replaced other ions beyond which some curvature may appear, assuming an initial penetration by Li to a depth of 350 m$\mu$.

Disks prepared as in Example 3b have been subjected to tests of fragmentation, and mechanical resistance to rupture. The point shock test was used, a tungsten carbide point producing a regular fragmentation into pieces of which the average side had a length of about 10 mm. The tension in the core was sufficient to produce this fine pattern. Disks have also been tested by increasing hydrostatic pressure until breaking occurred, the disk being placed on a circular support 61 mm. in diameter, in comparison with like disks untreated. The table gives the pressure in kg./cm.$^2$ at rupture. In the case of the disks of this invention pressure was applied to the cathode side.

TABLE

| | Untreated pieces | Treated pieces |
|---|---|---|
| Pressure at rupture in kg./cm.$^2$: | | |
| Average of 12 tests | 6 | 37.4 |
| Maximum thrust supported | 8.4 | 45.1 |

Example 4

Figure 4:
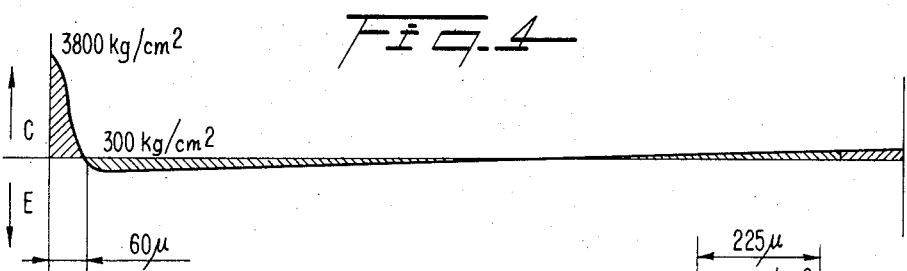
FIG. 4 is a diagram indicating the strain pattern in glass treated according to Example 4.

The first phase was carried out similarly to Example 3a, with a duration of hot contact of 5 minutes. The face in contact was enriched with Li to a depth of about 100 m$\mu$. The treated disk was subjeced to electromigration as in the preceding examples but with NaNO$_3$ (52% with 48% fine Al$_2$O$_3$) and the Li face was made cathodic. Temperature was 400° C. and electromigration continued until Na ions penetrated to a depth of 100 m$\mu$, requiring 47 minutes at 4 ma./cm.$^2$. The Li in the outer layer of the glass on the cathode side was ejected from the glass in practical totality, producing at the end of the treatment glass containing substantially nothing but Na ions as alkali metal, having its original composition, but having acquired strengthening strains. The anode face had no strains, Na having been replaced by Na from the anode disk, while on the cathode face sodium from the interior had replaced lithium, putting that zone into compression and producing the strain curve of FIG. 4 with 3800 kg./cm.$^2$ at the surface proceeding by reverse curve to 0 at 60 m$\mu$. Adjacent thereto is found a zone of tension of 300 kg./cm.$^2$ maximum which became slightly compressed as it neared the anode side.

Example 5

Figure 5:
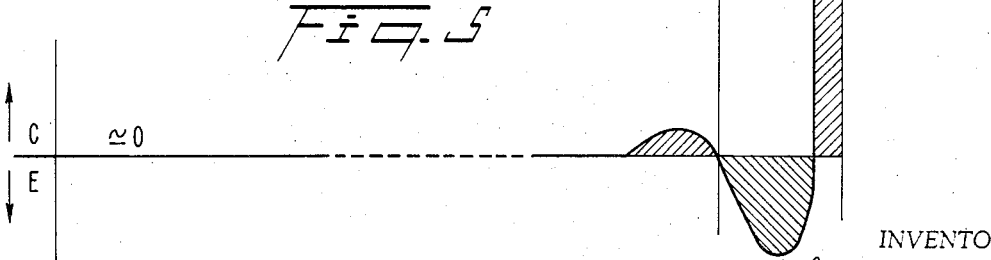
FIG. 5 is a curve indicating the distribution of strains in glass treated by the method of Example 5.

In this example there was one-side treatment by hot contact with a molten lithium salt bath for 60 minutes at 600° C., the impregnated face being made anodic during electromigration. Penetration by Li was 350 m$\mu$. The alkali salt used in the anode mixture was KNO$_3$, the current density was 4 ma./cm.$^2$, and treatment was for 24 minutes driving the K ions into a depth of 50 m$\mu$. The strain pattern of the glass is shown in FIG. 5, the significance of which is plain: an outer zone of equal thickness under compression from 7500 to 8500 kg./cm.$^2$, a contiguous zone 175 m$\mu$ thick under maximum tension of 3500 kg./cm.$^2$. Inside that, a layer under some compression, and beyond that no appreciable strains. The Li ions had migrated into the interior zone, which became tensioned, and the Na ions displaced compacted the third inner zone, which became compressed. Neither first or second phase treatment affected the cathode side.

The uses of such glass are many: as spectacle lenses, windows, windshields, port lights, spectator shields, etc.

The process is equally applicable to all shapes of glass and to all thicknesses, both even and uneven, plane, curved, and irregular.

Among the advantages of the invention are the making of a family of glasses which have important characteristics in common, the characteristics of which distinguish them from all known forms of strengthened glass, but also have the capacity of manufacture in a wide variety of forms by which they can be adapted to different uses or modified to suit variations of a particular use. The process is marked with high speed compared to known processes, accompanied by superiority of result. Small fragmentation is desirable in some uses, such as in windshields, and the process provides shields having that quality.

What is claimed is:

I claim:

1. A method of strengthening glass by ionic compaction which comprises substituting smaller ions for larger ions in a surface layer of the glass by hot contact of the glass with a salt of the smaller ion at a temperature above the strain point of the glass, until a change in the internal stresses of the glass has been achieved and the smaller ions are established in the glass network, reducing the temperature below the strain point, putting the said surface in contact with a molten salt of larger ions, making the said surface anodic by the passage of an electric field through the glass, until said larger ions have ejected smaller ions from said surface, thereby driving the smaller ions deeper into the glass and impacting the outer layers of the glass with the larger ions.

2. A method according to claim 1 in which the said larger ions are identical with those which were replaced by smaller ions.

3. A method according to claim 1 in which the glass is soda-silica-lime glass in which the said smaller ion is lithium, the first ion exchange is by hot contact at a temperature above the strain point of the glass, and the second replacement is by electromigration from a contiguous salt at a temperature above the strain point of the glass.

4. A method according to claim 1 in which the said surface layer after such hot contact is brought to a temperature below the strain point and is made anodic by the passage of direct current through the glass from a salt of the larger ion in contact therewith.

5. A method according to claim 1 in which the said surface layer after such hot contact is brought to a temperature below the strain point and is made cathodic by the passage of direct curent through the glass from a salt of the larger ion in contact therewith.

6. A method according to claim 1 in which substitution of a smaller for a larger ion occurs at a temperature above the strain point in a plurality of surface layers of the glass, and electromigration at a temperature below the strain point is performed by passing direct current through the glass from one to the other of said plurality of faces, of which one is rendered anodic and the other cathodic.

7. A method according to claim 1 in which the glass contains an alkali metal and the substitution of the smaller for the larger ion is of a smaller alkali ion for the larger alkali metal ion in the surface layer of the glass, and such substitution is by direct contact of the glass with a molten salt of the smaller ion at such temperature.

8. A method according to claim 7 in which the smaller ion is replaced by passing a direct current through the glass from a salt in contact therewith containing a larger alkali metal ion.

9. The method of strengthening silica-soda-lime glass which comprises putting at least one face of the glass in contact with a molten lithium salt at a temperature above about 500° C. until penetration by Li ions has been attained, and a change in the internal stresses of the glass has been achieved and the Li ions are established in the glass network, reducing the temperature below the strain point, putting the said face in contact with a molten potassium or sodium salt, and making that face anodic by passage of an electrical field through the glass until K or Na has ejected Li from the said face thereby driving Li ions deeper into the glass and impacting the outer layers of the glass with K or Na ions.

10. The method of claim 9 in which the penetration by Li ions is carried to a depth of about 150 microns at about 560 to 580° C. and the succeeding penetration by K ions is at a temperature below about 450° C. for a few minutes to a few tenths of minutes.

11. The method of claim 9 in which hot contact exchange is carried out on both faces of the sheet and electropenetration on only one face of the sheet.

12. The method of claim 9 in which the Li ions are driven into the center of the glass producing a layer under tension and on the cathodic face of the glass all or some of the Li ions are replaced by Na ions driven from the center of the glass, producing compression stresses different from those existing in the anodic face.

13. A method according to claim 9 in which Li ions are made to penetrate only one face of the glass and electromigration is carried out from the opposite face as anodic with K ions until both faces are under compression.

14. A method according to claim 9 in which Li ions are made to penetrate only one face of the glass and electromigration is imposed from the other face with Na ions until the said one face is under compression.

15. A method according to claim 9 in which Li ions are introduced into the glass from one side only, and electromigration is into the impregnated side with Na or K ions until that face is under compression and the Li ions are located in a more central layer of the glass.

16. A method of strengthening glass which comprises contacting at least one face of the glass with a molten bath containing lithium sulfate and manganese sulfate in a ratio of about 2 to 1 at a temperature above the strain point, putting the faces of the glass into contact with electrodes of which one comprises a fused sodium or potassium salt and alumina, and forcing an electrical field through the glass between the electrodes.

17. The method of claim 16 in which the electrode layers comprise $KNO_3$, current density is about 4 ma./cm.$^2$, and about 5 c. per cm.$^2$ are passed through the glass.

References Cited

UNITED STATES PATENTS

| | | | |
|---|---|---|---|
| 3,218,220 | 11/1965 | Weber | 65—30 X |
| 3,287,201 | 11/1966 | Chisholm et al. | 65—30 X |
| 3,505,049 | 4/1970 | Plumat | 65—30 |

FRANK W. MIGA, Primary Examiner

U.S. Cl. X.R.

65—31, 111, 114, 116; 204—1; 117—124